(12) United States Patent
Thommana et al.

(10) Patent No.: US 9,967,206 B1
(45) Date of Patent: May 8, 2018

(54) DISTRIBUTED SPECTRUM HARVESTING SYSTEMS AND METHODS

(71) Applicant: Rockwell Collins, Inc., Cedar Rapids, IA (US)

(72) Inventors: John Thommana, Cedar Rapids, IA (US); Matthew J. Thommana, Cedar Rapids, IA (US)

(73) Assignee: Rockwell Collin, Inc., Cedar Rapids, IA (US)

( * ) Notice: Subject to any disclaimer, the term of this patent is extended or adjusted under 35 U.S.C. 154(b) by 197 days.

(21) Appl. No.: 15/097,188

(22) Filed: Apr. 12, 2016

(51) Int. Cl.
*H04B 1/00* (2006.01)
*H04L 12/911* (2013.01)
*H04L 5/00* (2006.01)
*H04L 12/863* (2013.01)
*H04B 1/7143* (2011.01)
*H04L 7/02* (2006.01)
*H04H 20/16* (2008.01)

(52) U.S. Cl.
CPC ......... *H04L 47/822* (2013.01); *H04B 1/7143* (2013.01); *H04H 20/16* (2013.01); *H04L 5/0035* (2013.01); *H04L 7/02* (2013.01); *H04L 47/6225* (2013.01)

(58) Field of Classification Search
CPC ........ H04B 1/707; H04B 1/69; H04B 1/7075; H04B 1/692; H04B 1/713; H04B 1/715; H04B 1/7156; H04B 2001/7154; H04B 1/7143; H04J 13/10; H04J 13/00; H04L 47/822

USPC .......................... 375/133, 131, 130, 295, 219
See application file for complete search history.

(56) References Cited

U.S. PATENT DOCUMENTS

2009/0052499 A1* 2/2009 Hekmann ............ H04B 1/7136
375/132
2010/0173586 A1* 7/2010 McHenry ............ H04L 27/0006
455/62

OTHER PUBLICATIONS

U.S. Appl. No. 14/803,881, filed Jul. 20, 2015, Thommana.

* cited by examiner

*Primary Examiner* — Zewdu Kassa
(74) *Attorney, Agent, or Firm* — Angel N. Gerdzhikov; Donna P. Suchy; Daniel M. Barbieri

(57) ABSTRACT

Spectrum harvesting methods and spectrum harvesters implementing such spectrum harvesting methods are disclosed. In some embodiments, multiple spectrum harvesters may be configured to scan a frequency band of interest in a distributed and staggered manner. The results obtained by the spectrum harvesters may be shared with each other according to a round-robin scheme. Distributed scanning and round-robin sharing techniques configured in accordance with the inventive concepts disclosed herein may allow the spectrum harvesters to jointly function as a continuous spectrum scanner capable of providing near real time spectrum harvesting.

18 Claims, 3 Drawing Sheets

DISTRIBUTED SPECTRUM HARVESTING SYSTEMS AND METHODS

BACKGROUND

Dynamic Spectrum Access (DSA) is a spectrum sharing paradigm that allows secondary users to access unused spectrum in a frequency band licensed to primary users. A typical secondary user may utilize a spectrum harvester to scan a frequency band to look for unused spectrum. The secondary user may then use the harvested (unused) spectrum opportunistically.

It is noted that while a number of spectrum harvesting techniques are currently available, the currently available spectrum harvesting techniques tend to have difficulties finding frequency hopping emitters because frequency hopping emitters can only be found if their transmissions coincide with the scanning cycle of the spectrum harvesting technique used. In addition, some radio frequency emitters (fixed frequency or frequency hopped) may not be detectable due to shadowing, fading, noise, and various other factors.

SUMMARY

In one aspect, embodiments of the inventive concepts disclosed herein are directed to a communication device configured to participate in a network. The communication device may include a spectrum harvester configured to obtain a first set of spectral occupancy data by scanning a sub-band of a frequency band of interest. The communication device may also include a receiver configured to receive a second set of spectral occupancy data broadcasted over the network. The communication device may further include a processor configured to update the first set of spectral occupancy data based on the second set of spectral occupancy data. The processor may be further configured to determine whether any frequency channel in the frequency band of interest is usable to the communication device based on the updated first set of spectral occupancy data. The communication device may use a transmitter to broadcast the updated first set of spectral occupancy data over the network.

In a further aspect, embodiments of the inventive concepts disclosed herein are directed to a communication system. The communication system may include multiple communication devices participating in a network. Each communication device may include a spectrum harvester configured to obtain a first set of spectral occupancy data by scanning a sub-band of a frequency band of interest. Each communication device may also include a receiver configured to receive a second set of spectral occupancy data broadcasted over the network. Each communication device may further include a processor configured to update the first set of spectral occupancy data based on the second set of spectral occupancy data. The processor may be further configured to determine whether any frequency channel in the frequency band of interest is usable to the communication device based on the updated first set of spectral occupancy data. Each communication device may use a transmitter to broadcast the updated first set of spectral occupancy data over the network.

In another aspect, embodiments of the inventive concepts disclosed herein are directed to a method. The method may include: scanning a sub-band of a frequency band of interest to obtain a first set of spectral occupancy data; receiving a second set of spectral occupancy data broadcasted over a network; updating the first set of spectral occupancy data based on the second set of spectral occupancy data and determining whether any frequency channel in the frequency band of interest is usable to a communication device based on the updated first set of spectral occupancy data; and broadcasting the updated first set of spectral occupancy data over the network.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
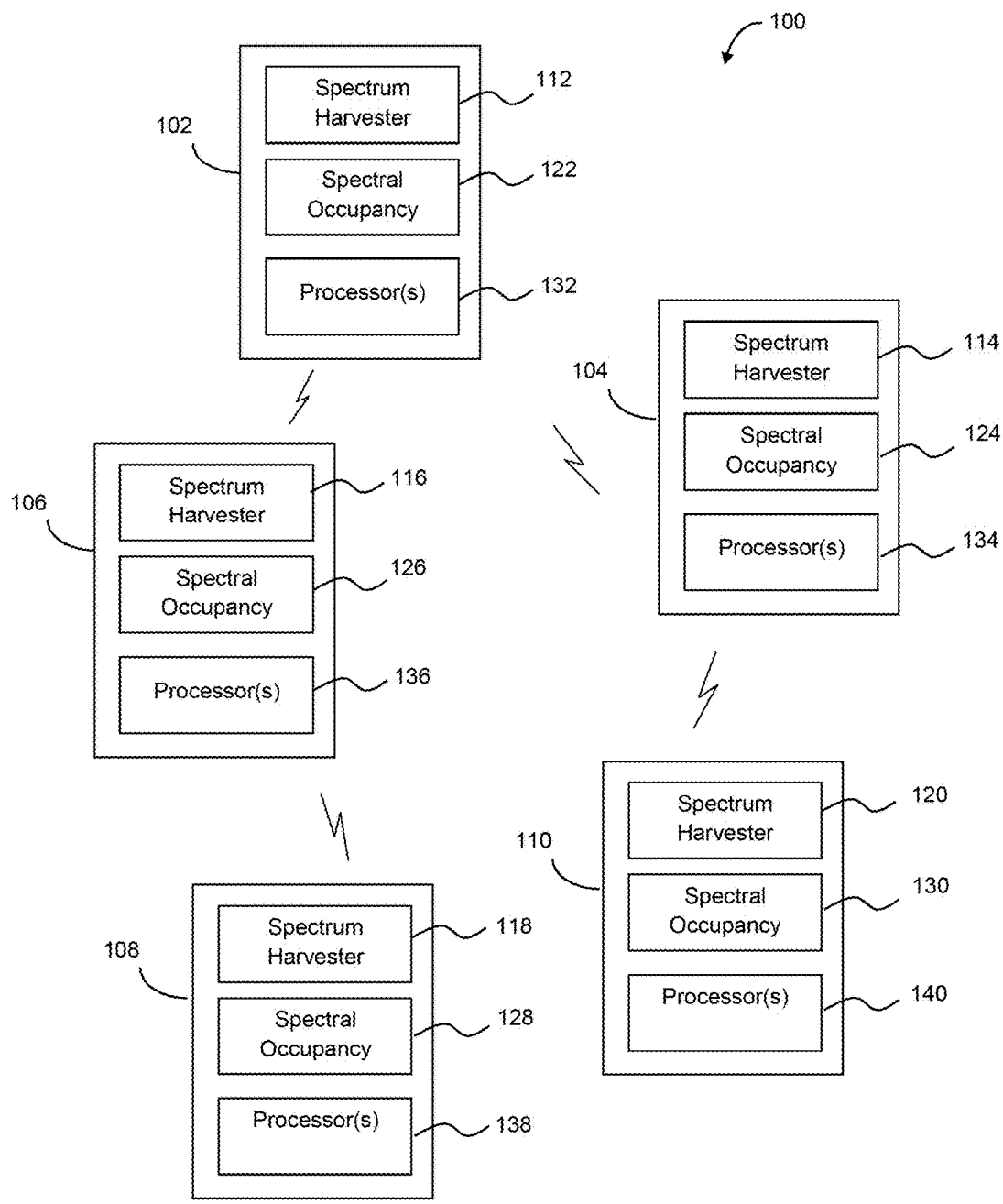
FIG. 1 is a block diagram of an exemplary network of communication devices according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments in accordance with the inventive concepts disclosed herein are directed to spectrum harvesting methods and spectrum harvesters implementing such spectrum harvesting methods. In some embodiments, multiple spectrum harvesters may be configured to scan a frequency band of interest in a distributed and staggered manner. The results obtained by the spectrum harvesters may be shared with each other according to a round-robin scheme. Distributed scanning and round-robin sharing techniques configured in accordance with the inventive concepts disclosed herein may allow the spectrum harvesters to jointly function as a continuous spectrum scanner capable of providing near real time spectrum harvesting.

Referring generally to FIG. 1, a block diagram of an exemplary network 100 of communication devices (e.g., radios) 102-110 configured in accordance with an embodiment of the inventive concepts disclosed herein is shown. The communication devices 102-110 may be opportunistic communication devices having a secondary access to a frequency band of interest. The communication devices 102-110 may include multiple frequency scanners (may also be referred to as spectrum harvesters) 112-120. The spectrum harvesters 112-120 may be synchronized using synchronization timing information available on the network 100 (e.g., timing information obtained from precise timing sources like satellite navigation systems or atomic clocks). The spectrum harvesters 112-120 may be distributed across the network 100 to help scan the frequency band of interest. It is noted that distributing the spectrum harvesters 112-120 in this manner may allow the spectrum harvesters 112-120 to mitigate detection difficulties caused by shadowing, fading, noise, and the like, effectively allowing the spectrum harvesters 112-120 to operate jointly with improve overall detection accuracy.

Distributing the spectrum harvesters 112-120 in this manner also helps improve the overall scanning speed. For example, it may take a single spectrum harvester scanning at 45 GHz/second a total of 6667 µs to scan a 300 MHz band, which is inadequate (too slow) for the spectrum harvester to find all frequency emitters hopping in the 300 MHz band at 500 hops per second (which, for illustrative purposes, may require the scanning to be completed in less than 750 µs). If multiple spectrum harvesters can be used to simultaneously scan the 300 MHz band in a staggered manner, however, these spectrum harvesters may collectively identify most frequency emitters in the band. Continuing with the example described above, a 45 GHz/second spectrum harvester may scan a sub-band of 33 MHz within the required 750 µs, which means that if at least nine of such spectrum harvesters are staggered at 33 MHz apart from each other, these spectrum harvesters may be able to collectively scan the entire 300 MHz band within the required amount of time.

It is to be understood that the specific references to the 300 MHz band and the 45 GHz/second spectrum harvester in the example described above are merely for illustrative purposes and are not meant to be limiting. It is noted that while using nine spectrum harvesters in the example described above may be able to cover the band of interest, the number of communication devices 102-110 and the number of spectrum harvesters 112-110 distributed within the network 100 may vary without departing from the broad scope of the inventive concepts disclosed herein.

It is also noted that various techniques may be utilized to help determine how to stagger the spectrum harvesters 112-110 to adequately cover a given band of interest. For instance, the decision of which spectrum harvester should scan which sub-band (and in what order) may be determined in accordance with a predetermined set of rules, in accordance with a pseudorandom assignment, or based on the number of spectrum harvesters 112-110 and/or their identifiers. It is noted that while the sub-bands may be staggered, it does not necessarily imply that the sub-bands are mutually exclusive. In other words, sub-bands scanned by different spectrum harvesters 112-110 may overlap without departing from the broad scope of the inventive concepts disclosed herein.

Staggering of the spectrum harvesters 112-110 may also be controlled and/or adjusted. In some embodiments, a staggering command may be sent to the spectrum harvesters 112-110 during waveform startup. The staggering command may include bands to scan, resolution bandwidth, staggering offset with respect to waveform frame timing, scan rate and the like. Staggering commands may also be sent periodically, in response to predetermined events, in response to user requests, or combinations thereof, to the spectrum harvesters 112-110. Additionally, in some embodiments, if it is determined (e.g., statistically determined) that the spectrum harvesters 112-110 (or the exemplary network 100 in general) are interfering with other communication devices, staggering commands may be issued to adjust the staggering of the spectrum harvesters 112-110 accordingly.

It is noted that while distributing and staggering the spectrum harvesters 112-120 in accordance with the inventive concepts disclosed herein may help improve the overall scanning speed and detection accuracy, distributing and staggering the spectrum harvesters 112-120 may also introduce a challenge because the communication device 102-110 in the network 100 may potentially have different spectral occupancy data 122-130 determined using their own spectrum harvesters 112-120. The communication devices 102-110 may therefore need to implement a spectral occupancy data distribution process to address this challenge.

In some embodiments, the communication devices 102-110 may be configured to share their spectral occupancy data 122-130 with each other according to a round-robin scheme. For instance, a first communication device 102 may broadcast its spectral occupancy data (referred to as the first spectral occupancy data) 122 across the network 100. The first spectral occupancy data 122 may be received by one or more communication devices 104-110, and upon receiving the first spectral occupancy data 122, one or more processors 134-140 associated with the communication devices 104-110 may update their own spectral occupancy data 124-130 at least partially based on the first spectral occupancy data 122 received (e.g., remove frequency channels that are reported as occupied by the first spectral occupancy data 122). Subsequently (e.g., after the completion of the update or after lapse of a predetermined amount of time allotted to perform the update), a second communication device 104 may broadcast its updated spectral occupancy data (referred to as the second spectral occupancy data) 124 across the network 100. The second spectral occupancy data 124 may be received by one or more communication devices 102 and 106-110, and upon receiving the second spectral occupancy data 124, one or more processors 132 and 136-140 associated with the communication devices 102 and 106-110 may update their own spectral occupancy data 122 and 126-130 at least partially based on the second spectral occupancy data 124.

The other communication devices (e.g., the communication devices 106-110) may taken turns and repeat this spectral occupancy data distribution process, eventually providing every communication device 102-110 in the network 100 at least one opportunity to broadcast their spectral occupancy data 124-130. In some embodiments, at least one unit of the predetermined amount of time allotted to perform the update may also be allotted at the end of the round-robin scheme to ensure that every communication device 102-110 has enough time to update their spectral occupancy data 124-130 after receiving the last spectral occupancy data broadcast. In this manner, frequency channels that are reported as occupied by any one of the communication devices 102-110 can be removed from the spectral occupancy data 122-130 used by every communication device 102-110 in the network 100.

It is to be understood that the round-robin scheme configured in accordance with the inventive concepts disclosed herein does not require the communication devices 102-110 to follow the same broadcasting order every round. While the communication devices 102-110 may be configured to follow the same broadcasting order, the broadcasting order may change (in predetermined or pseudorandom manners) in some embodiments without departing from the broad scope of the inventive concepts disclosed herein. It is contemplated that changing the broadcasting order may help to mitigate potential concerns such as jamming and the like.

It is contemplated that the distributed frequency scanning and the round-robin based spectral occupancy data distribution described above may be jointly referred to as a spectrum harvesting process in accordance with the inventive concepts disclosed herein. In some embodiments, the spectrum harvesting process may need to be carried out within a predetermined amount of time and on a repeating basis. In some embodiments, the predetermined amount of time may coincide with the duration of an epoch agreed by the communication devices 102-110 in the network 100.

More specifically, the communication devices 102-110 in the network 100 may be configured to operate according to predetermined repeating cycles referred to as epochs. For illustrative purposes, suppose the epoch is defined to be one second, then the communication devices 102-110 in the network 100 may be allocated one second (e.g., a first epoch) to carry out the spectrum harvesting process and use the harvested frequency channels for communication in the next second (e.g., a second epoch) while they continue to carry out the spectrum harvesting process to harvest usable frequency channels for the epoch after that (e.g., a third epoch). It is noted that because frequency channels harvested in the current epoch may no longer be usable in the next epoch, a statistical analysis may be utilized in some embodiments to help determine which frequency channels harvested in the current epoch are likely to remain usable in the next epoch.

For example, in some embodiments, a running average of spectral occupancy rate may be maintained for each frequency channel in the frequency band of interest. The average spectral occupancy rate of a particular frequency channel may reveal that, on average, there is a time gap between two uses of that particular frequency channel. Information as such may be used to help assess the probability that a frequency channel determined to be usable in the current epoch will remain usable in the next epoch. In some embodiments, the frequency channels in the frequency band of interest may be sorted at least partially based on their spectral occupancy rates and frequency channels that are deemed more likely to remain usable in the next epoch may be selected and used for the next epoch.

It is to be understood that maintaining running averages of spectral occupancy rates of the various frequency channels in a frequency band of interest is presented merely for illustrative purposes and is not meant to be limiting. It is contemplated that other statistical measurements/models may be utilized in addition to (or instead of) spectral occupancy rates without departing from the broad scope of the inventive concepts disclosed herein.

It is also to be understood that the one-second duration of the epoch is merely exemplary and is not meant to be limiting. It is contemplated that the duration of the epoch may vary without departing from the broad scope of the inventive concepts disclosed herein. It is further noted that while the round-robin based spectral occupancy data distribution process may be carried out at least once in each epoch, it is possible to configure the communication devices 102-110 to carry out the round-robin based spectral occupancy data distribution process more than once per epoch (e.g., every communication device 102-110 in the network 100 may be provided with at least two opportunities to broadcast their spectral occupancy data) to help further improve the reliability of the network 100. It is contemplated that the duration of the epoch, and/or the number of opportunities each communication device gets to broadcast their spectral occupancy data per epoch, may be predetermined based on studies of the network 100 (or studies of simulations of the network 100). For example, in some embodiments, the duration of the epoch may be selected based on the hop rate (e.g., a 2 second epoch for a 500 hops/sec system may cover more than 99% of the frequencies available in a given frequency hopping set), the number of transmissions needed per user (e.g., to account for every user in the system), as well as various other factors. It is also contemplated that the duration of the epoch, and/or the number of opportunities each communication device gets to broadcast their spectral occupancy data per epoch, may also be dynamically adjustable to adapt to certain operating conditions without departing from the broad scope of the inventive concepts disclosed herein.

As will be appreciated from the above, the spectrum harvesting process configured in accordance with the inventive concepts disclosed herein may allow the distributed spectrum harvesters 112-120 to jointly function as a continuous spectrum scanner capable of providing fast and accurate spectrum harvesting to facilitate operations of the communication devices 102-110 participating in the network 100. It is contemplated that the communication devices 102-110 may utilize the harvested frequency channels in a variety of manners without departing from the broad scope of the inventive concepts disclosed herein. In some embodiments, the communication devices 102-110 may even implement frequency hopping using some of the harvested frequency channels.

A potential challenge associated with implementing frequency hopping using harvested frequency channels is that it may take time for the communication devices 102-110 to harvest enough frequency channels to support a frequency hopping pattern (which requires a minimal set of frequency channels). It is noted that while the communication devices 102-110 may have the option to use only the harvest frequency channels to form the frequency hopping pattern, the amount of time needed to achieve this may be non-deterministic and non-ideal. It is therefore contemplated that a hybrid approach may be utilized in some embodiments to help form frequency hopping pattern(s) in a timely manner.

More specifically, in some embodiments, a default set of frequency channels may be allocated to the network 100. The communication devices 102-110 in the network 100 may be configured to operate according to a default frequency hopping pattern that uses only the default set of frequency channels. The communication devices 102-110 may also be configured to keep harvesting frequency channels in the frequency band of interest utilizing the spectrum harvesting process previously described. The communication devices 102-110 may then be provided with options to continue using the default set of frequency channels, augment the default set of frequency channels with harvested frequency channels, or replace the default set of frequency channels with one or more sets of harvested frequency channels. It is contemplated that specific implementations may vary depending on operating conditions without departing from the broad scope of the inventive concepts disclosed herein.

It is also contemplated that providing a default set of frequency channels may help improve the resilience of the network 100 if the network 100 implements frequency hopping. For example, there may be instances when one or more communication devices 102-110 can get out of synchronization. This may happen, for example, due to changes to the network 100 (e.g., communication devices may join, leave, or merge). To help an unsynchronized communication device join (or get back into) the network 100, all communication devices configured to participate in the network 100 may agree to use the default frequency hopping pattern according to a configurable schedule. For illustrative purposes, suppose that all communication devices 102-110 in the network 100 agrees to use the default frequency hopping pattern every n number of epochs (or every n number of frames of transmission or the like), a new communication device attempting to join the network 100 may hop according to the default frequency hopping pattern and wait at most n number of epochs (or frames) for the communication devices 102-110 to come back to the default frequency hopping pattern again. The new communication device attempting to join the network 100 may then be able to communicate with the rest of the network 100 for at least one epoch, which may be enough time for the new communication device to receive various types of information regarding the network 100 (typically referred to as boot strap or overhead information), which can help the new communication device establish synchronization and properly join the network 100.

Figure 2:
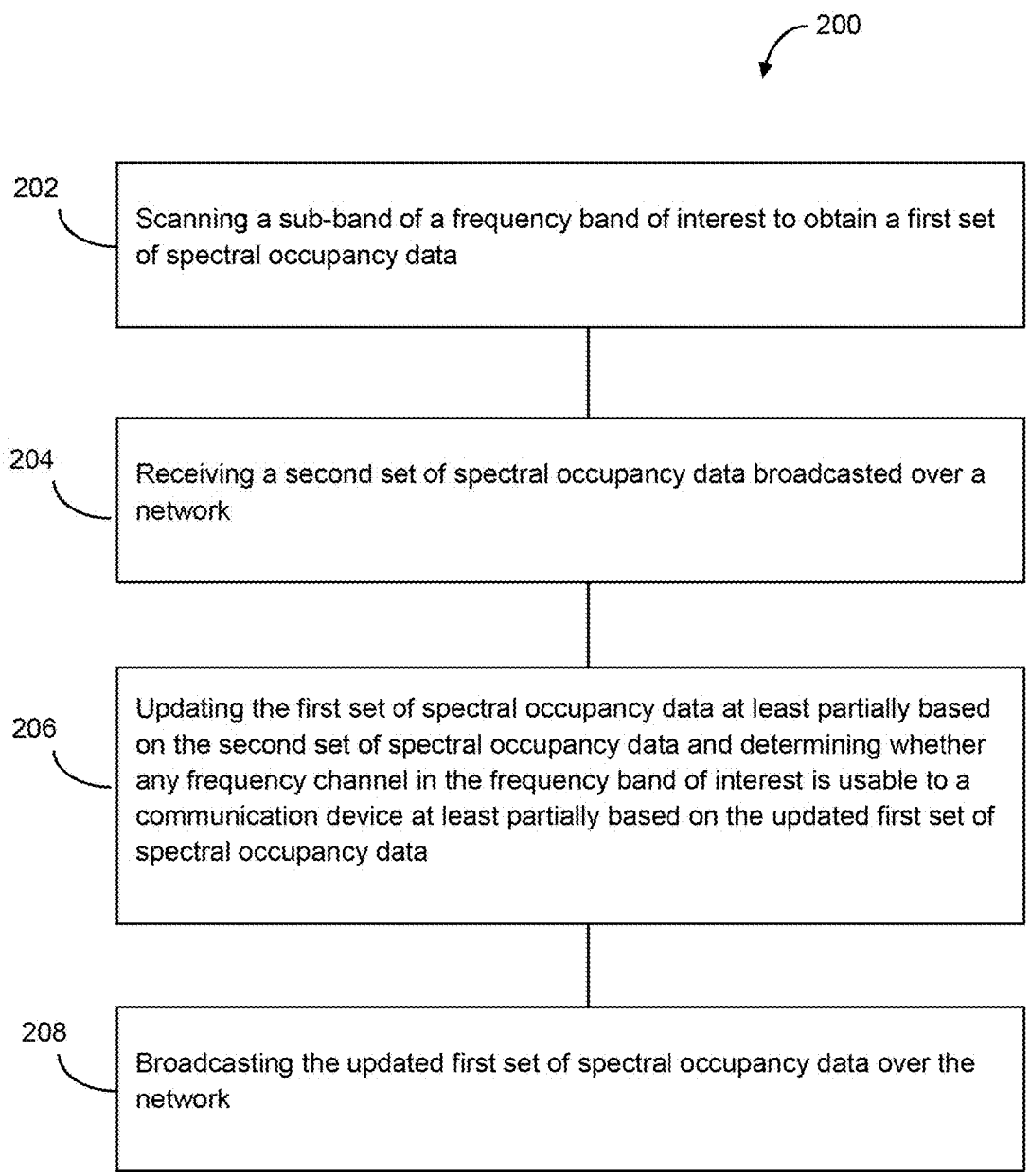
FIG. 2 is a flow diagram of an exemplary spectrum harvesting method according to an exemplary embodiment of the inventive concepts disclosed herein.

Referring now to FIG. 2, a flow diagram depicting an embodiment of a spectrum harvesting method 200 in accordance with the inventive concepts disclosed herein is shown. The spectrum harvesting method 200 may be carried out by a number of communication devices (e.g., a radios) in a distributed and staggered manner. More specifically, each communication device may scan at least a sub-band of a frequency band of interest to obtain its own spectral occupancy data in a step 202. In some embodiments, the communication devices may participate in a network and may take turns to broadcast their own spectral occupancy data according to a round-robin scheme. Each communication device participating in the network may therefore receive at least one set of spectral occupancy data broadcasted from at least one other communication device over the network in a step 204, and upon receiving the set of spectral occupancy data broadcasted over the network, each communication device may update their own spectral occupancy data in a step 206 at least partially based on the set of spectral occupancy data broadcasted over the network.

According to the round-robin scheme, each communication device may also broadcast their own spectral occupancy data over the network in a step 208 at least once. The steps 202-208 may then be repeated again to serve as a continuous spectrum scanner for the network of communication devices. In some embodiments, the steps 202-208 may be carried out within a predetermined amount of time referred to as an epoch, and as previously described, the steps 202-208 may be carried out in a current epoch to help harvest usable frequency channels for the next epoch.

Figure 3:
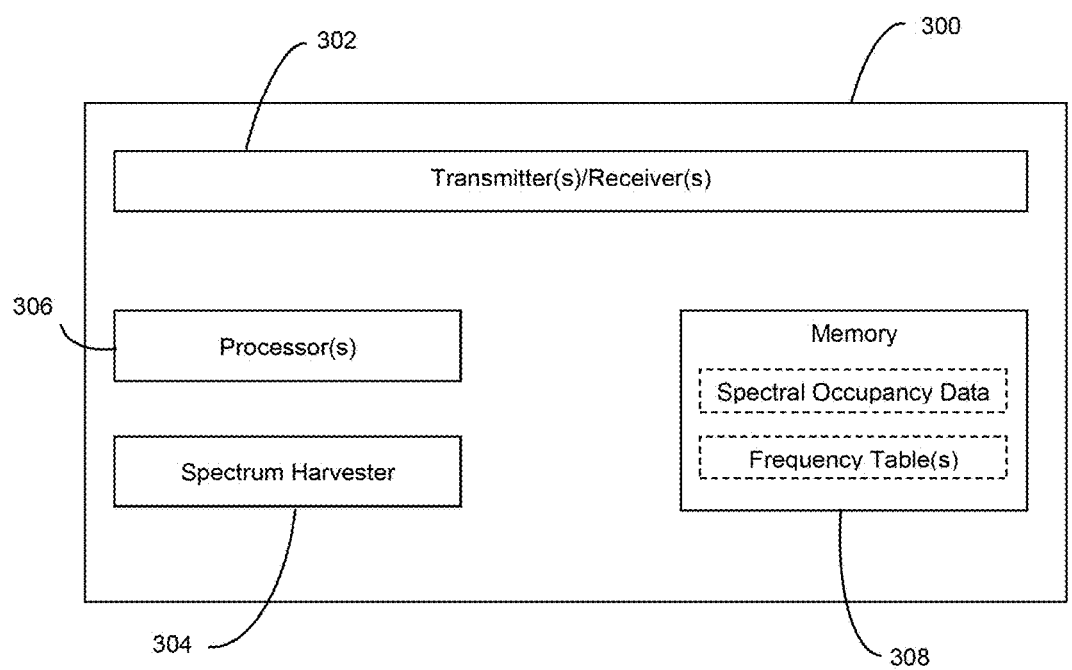
FIG. 3 is a block diagram of an exemplary communication device according to an exemplary embodiment of the inventive concepts disclosed herein.

FIG. 3 is a simplified block diagram depicting an exemplary communication device (e.g., a radio) 300 configured to carry out the spectrum harvesting method 200 presented above. As shown in FIG. 3, the communication device 300 may include one or more transmitters and/or receivers (may be jointly referred to as transceivers) 302, one or more frequency scanners (may be alternatively referred to as spectrum harvesters) 304, one or more processors 306, and one or more non-transitory processor-readable memories 308. The one or more non-transitory processor-readable memories 308 may be utilized to store spectral occupancy data obtained by the one or more spectrum harvesters 304 as well as any default/harvested frequency channels (if available). The one or more processors 306 may be implemented as dedicated processing units, application-specific integrated circuits (ASICs), field-programmable gate arrays (FPGAs) or various other types of processors or processing units. The one or more processors 306 may be configured to carry out the various functions and method steps described above.

In some embodiments, the communication device 300 may use a main half-duplex transceiver 302 for communication and use one or more auxiliary receive-only receivers as the spectrum harvesters 304. The spectrum harvester(s) 304 may be configured to support frequency hopping. The spectrum harvester(s) 304 may also be configured to support the same frequency bands covered by the main transceiver 302, allowing the main transceiver 302 and the spectrum harvester(s) 304 to support multi-band channels (e.g., to provide coverage for very high frequency, ultra high frequency, L-band, S-band, and/or C-band). Additionally and/or alternatively, the spectrum harvester(s) 304 may be configured to support different frequency bands covered by the main transceiver 302. For example, if the main transceiver 302 is configured to operate primarily in ultra high frequency, the spectrum harvester(s) 304 may be configured to scan L-band to find usable spectrum in L-band, allowing the communication device 300 to operate in ultra high frequency and L-band on a hop-by-hop basis. Furthermore, the frequency band covered by the spectrum harvester(s) 304 may not need to be contiguous (e.g., the frequency band may be specified as 1300-1350 MHz and 1725-1800 MHz), and in some embodiments, the frequency band(s) covered by the spectrum harvester(s) 304 may be configurable and may be specified by a user (e.g., a mission planner).

It is contemplated that communication devices configured in accordance with the inventive concepts disclosed herein may be utilized in various types of operating environments. In some embodiments, communication devices configured in accordance with the inventive concepts disclosed herein may be configured as mobile communication devices, which may be installed onboard various types of vehicles, including airborne, land-based, and maritime vehicles. It is to be understood, however, that communication devices configured in accordance with the inventive concepts disclosed herein may be utilized in various other types of operating environments without departing from the broad scope of the inventive concepts disclosed herein.

It is also contemplated that communication devices configured in accordance with the inventive concepts disclosed herein may be adapted to operate in a variety of waveforms and according to a variety of communication protocols. In some embodiments, communication devices configured in accordance with the inventive concepts disclosed herein may be adapted to operate using the Tactical Data Radio System (TDRS) waveform. It is to be understood, however, that the communication devices configured in accordance with the inventive concepts disclosed herein may be adapted to operate in other waveforms and/or in accordance with other communication protocols without departing from the broad scope of the inventive concepts disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form hereinbefore described being merely an explanatory embodiment thereof, it is the intention of the following claims to encompass and include such changes.

What is claimed is:

1. A communication device configured to participate in a network, the communication device comprising:

a spectrum harvester configured to obtain a first set of spectral occupancy data by scanning at least a sub-band of a frequency band of interest;

a receiver configured to receive at least one second set of spectral occupancy data broadcasted over the network;

at least one processor configured to update the first set of spectral occupancy data at least partially based on the at least one second set of spectral occupancy data, the at least one processor further configured to determine whether any frequency channel in the frequency band of interest is usable to the communication device at least partially based on the updated first set of spectral occupancy data;

a transmitter configured to broadcast the updated first set of spectral occupancy data over the network; and a non-transitory processor-readable memory configured to store a default set of frequency channels allocated to the network, wherein the communication device is configured to implement frequency hopping to communicate with other communication devices participating in the network and operate according to a default frequency hopping pattern utilizing only the default set of frequency channels according to a configurable schedule.

2. The communication device of claim 1, wherein the communication device is a first communication device and the at least one second set of spectral occupancy data is broadcasted by at least one second communication device participating in the same network as the first communication device, and wherein the first communication device and the at least one second communication device are configured to obtain spectral occupancy data by scanning staggered sub-bands of the frequency band of interest.

3. The communication device of claim 1, wherein the communication device is a first communication device and the at least one second set of spectral occupancy data is broadcasted by at least one second communication device participating in the same network as the first communication device, and wherein the first communication device and the at least one second communication device are configured to broadcast spectral occupancy data over the network according to a round-robin scheme.

4. The communication device of claim 1, wherein the communication device is configured to obtain the first set of spectral occupancy data, receive the at least one second set of spectral occupancy data, update the first set of spectral occupancy data, and broadcast the updated first set of spectral occupancy data within a predetermined repeating cycle.

5. The communication device of claim 1, wherein the communication device is configured to operate according to the default frequency hopping pattern every predetermined number of cycles.

6. The communication device of claim 1, wherein the transmitter and the receiver of the communication device are configured to operate in a frequency band substantially identical to the frequency band of interest.

7. The communication device of claim 1, wherein the transmitter and the receiver of the communication device are configured to operate in a frequency band at least partially different from the frequency band of interest.

8. The communication device of claim 1, wherein the spectrum harvester is synchronized to synchronization timing information available on the network.

9. The communication device of claim 1, wherein the configurable schedule is use of the default frequency hopping pattern every n number of epochs or every n number of frames of transmission.

10. A communication system, comprising:
a plurality of communication devices participating in a network, each communication device of the plurality of communication devices comprising:
a spectrum harvester configured to obtain a first set of spectral occupancy data by scanning at least a sub-band of a frequency band of interest;
a receiver configured to receive at least one second set of spectral occupancy data broadcasted over the network;
at least one processor configured to update the first set of spectral occupancy data at least partially based on the at least one second set of spectral occupancy data, the at least one processor further configured to determine whether any frequency channel in the frequency band of interest is usable to the communication device at least partially based on the updated first set of spectral occupancy data;
a transmitter configured to broadcast the updated first set of spectral occupancy data over the network; and
a non-transitory processor-readable memory configured to store a default set of frequency channels allocated to the network, wherein each communication device is configured to implement frequency hopping to communicate with other communication devices participating in the network and operate according to a default frequency hopping pattern utilizing only the default set of frequency channels according to a configurable schedule.

11. The communication system of claim 10, wherein the communication devices participating in the network are configured to obtain spectral occupancy data by scanning staggered sub-bands of the frequency band of interest.

12. The communication system of claim 11, wherein the communication devices participating in the network are configured to broadcast spectral occupancy data over the network according to a round-robin scheme.

13. The communication system of claim 12, wherein each communication device participating in the network is configured to obtain the first set of spectral occupancy data, receive the at least one second set of spectral occupancy data, update the first set of spectral occupancy data, and broadcast the updated first set of spectral occupancy data within a predetermined repeating cycle.

14. The communication system of claim 10, wherein the communication device is configured to operate according to the default frequency hopping pattern every predetermined number of cycles.

15. The communication system of claim 10, wherein the transmitter and the receiver of the communication device are configured to operate in a frequency band substantially identical to the frequency band of interest.

16. The communication system of claim 10, wherein the transmitter and the receiver of the communication device are configured to operate in a frequency band at least partially different from the frequency band of interest.

17. The communication system of claim 10, wherein the spectrum harvester is synchronized to synchronization timing information available on the network.

18. The communication system of claim 10, wherein the configurable schedule is use of the default frequency hopping pattern every n number of epochs or every n number of frames of transmission.

* * * * *